March 2, 1926.  1,575,049
R. GRAEF
METHOD OF COOLING THE ELECTRODES IN OZONIZERS
Filed Feb. 10, 1925
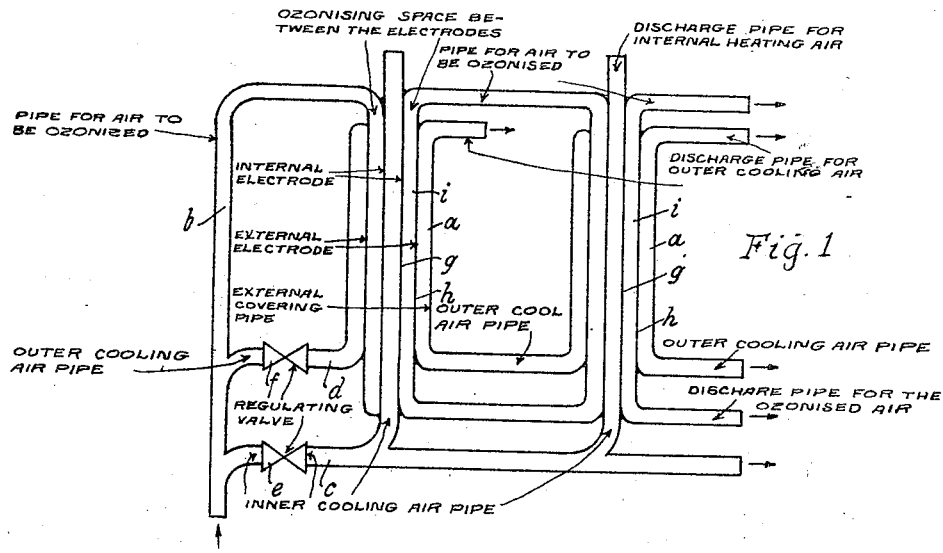
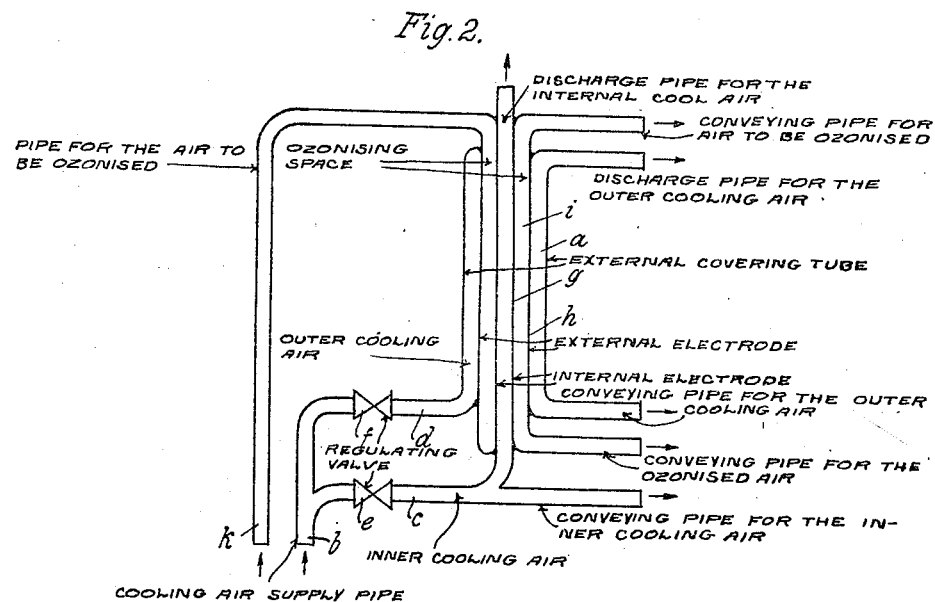
Inventor
R. Graef
By Marks & Clerk Patented Mar. 2, 1926.

1,575,049

UNITED STATES PATENT OFFICE.

REINHOLD GRAEF, OF BERLIN, GERMANY, ASSIGNOR TO AKTIENGESELLSCHAFT FUR OZON INDUSTRIE, OF BERLIN, GERMANY.

METHOD OF COOLING THE ELECTRODES IN OZONIZERS.

Application filed February 10, 1925. Serial No. 8,309.

*To all whom it may concern:*

Be it known that I, REINHOLD GRAEF, a citizen of the German Republic, and residing at 43 Gneisenaustrasse, Berlin, Germany, have invented a certain new and useful Method of Cooling the Electrodes in Ozonizers, of which the following is a specification.

Of the various cooling methods used in ozonizers air cooling is without doubt the most ideal one, as with water cooling, owing to the good conductivity of the water, the slightest leakage may easily cause undesired short circuits of the electric high tension current, while metal cooling entails complicated and costly constructions, even if it is possible to obtain a sufficient heat conduction by this means, so that this method of cooling has been entirely abandoned in modern constructions.

If in spite of the disadvantages of water cooling this method of cooling has been employed in plants for producing considerable quantities of ozone, this is explained by the fact that none of the air-cooling devices as constructed hitherto have proved sufficiently successful for making them suitable for conducting away large quantities of heat.

The present invention relates to an ozone generator provided with an air-cooling device, which successfully counteracts the disintegration of the ozone.

In the accompanying drawing wherein an approved embodiment of the invention is illustrated, Fig. 1 is a diagrammatical view of the invention.

Fig. 2 is a diagrammatical view of a modification thereof.

Fig. 1 represents an ozone generator consisting of the ozonizers $a$, three of which are indicated in the figure, the air-distributing system $b$, the cooling air pipes $c$ and the regulating members $e$ and $f$.

The ozone generator operates in the following manner:—Air is conveyed through the air supply pipe $b$ to the discharging space of the ozonizers $a$, while at the same time at the other end of the ozonizers cooling air is supplied through the cooling air pipe $c$ to the internal electrodes $g$, the amount of air being regulable by means of the regulating member $e$: Similarly cooling air is conveyed to the space around the external electrode $h$ through the cooling air pipe $d$, which air can be regulated by means of the regulating member $f$. By means of the two regulating members $e$ and $f$ two independent streams of cooling air can be sent, which bear a definite proportion to the air to be ozonized, which is supplied to the discharging space $i$ between the electrodes, which streams of cooling air are sufficient to conduct away the heat which has a detrimental effect on the disintegration of the ozone and the resisting capacity of the dielectric.

In addition thereto, for getting the best effect from these streams of cooling air, the cooling air is preferably introduced at the outlet end for the ozonized air, as it is found that in ozonizers there always is an increase in temperature from the inlet opening of the air to be ozonized to the outlet opening of the ozonized air. This is counteracted in a particularly effective manner by introducing the cooling air at the most strongly heated end of the ozonizers.

Thus by means of the regulable cooling device described it is possible to use streams of cooling air of any strength and in the most effective manner.

Suitably modified this air cooling device is also suitable, when using the ozone generator, for producing ozone from pure oxygen, as in this case, as is shown in Fig. 2, an oxygen supply pipe $k$ is provided in addition to the air distributing pipe $b$.

What I claim is:—

1. A method of cooling the internal and external electrodes in ozone generators, consisting in passing cooling air in two independently regulable streams along the internal and external electrodes, as set forth.

2. A method of cooling the internal and external electrodes in ozone generators, consisting in passing cooling air in two independently regulable streams along the internal and external electrodes in the opposite direction to the flow of the gas to be ozonized, as set forth.

In testimony whereof I have signed my name to this specification.

REINHOLD GRAEF.